3,250,714
ETHYLENE/VINYL ACETATE COPOLYMERS AS VISCOSITY INDEX IMPROVERS FOR MINERAL OILS
Stephan Ilnyckyj and George A. Holder, Sarnia, Ontario, Canada, assignors to Esso Research and Engineering Company, a corporation of Delaware
No Drawing. Filed Jan. 16, 1964, Ser. No. 338,007
9 Claims. (Cl. 252—56)

The present invention relates to ethylene/vinyl acetate copolymers and to their use as viscosity index (V.I.) improvers. In one particular aspect, this invention relates to mineral oil compositions which contain viscosity index improving amounts of certain critically defined ethylene/vinyl acetate copolymers.

Throughout the years, there has been considerable interest in materials that can added to mineral oil compositions (e.g., mineral lubricating oils) to improve their viscosity-temperature relationships. It is well known that mineral oils will undergo undesirable changes in viscosity when subjected to changes in temperature, i.e., they "thin out" or have less viscosity at high temperatures, and they thicken or increase in viscosity at low temperatures. In many applications of mineral lubricating oils (particularly when they are used as crankcase oils in piston type internal combustion engines) it is desirable that they undergo relatively small changes in viscosity throughout the entire operating temperature range of the engine, i.e., from the low temperatures that can exist in a cold engine (before starting) up to the relatively high operating temperatures of an engine running under load. The oil must not be so viscous when cold that starting becomes intolerably difficult nor must it become so thin when hot that an oil film cannot be maintained between moving surfaces to prevent metal-to-metal contact.

The term viscosity index (V.I.) can be applied to express the relative viscosity change which an oil undergoes with changes in temperature. Viscosity index determinations are described in ASTM–D–567. From the standpoint of viscosity, the perfect oil would be one having a constant viscosity regardless of temperature changes. No such oil exists, however. Consequently, viscosity index is a useful criterion for selecting oils. A high viscosity index denotes an oil which undergoes less viscosity change with respect to temperature than does an oil having a low viscosity index.

Where it is either impossible or not practical to produce mineral lubricating oils of sufficiently high viscosity index by ordinary refining methods, it has become the custom of the trade to add certain materials known as V.I. improvers to lubricating oil base stocks to thereby improve both the lubricating characteristics and the viscosity characteristics of the base stock. The materials most generally used as V.I. improvers are polymers, such as polyisobutylene and polymethacrylate esters. However, many of the polymeric materials that have been found to be useful as V.I. improvers have the disadvantage of tending to depolymerize when employed in mineral oil compositions serving as crankcase lubricants. The cause is considered to be the shearing effect of the moving parts of the engine. Shear breakdown is, of course, undesirable because it leads to increased oil consumption and in some cases loss of lubricating protection. Thus, there has been a need for V.I. improvers that will not undergo sheak breakdown in use.

Now, ethylene/vinyl acetate copolymers are generally known in the art. See, for example, U.S. Patents Nos. 2,499,723, 2,657,188, 3,048,479 and 3,093,623. Those references are incorporated herein in their entireties. Certain of these ethylene/vinyl acetate copolymers have been suggested for use as additives for improving the viscosity index of carboxylic acid esters of the type used as synthetic lubricants (Coffman et al. in U.S. No. 2,499,723); as plasticizers for vinyl resins (Denison et al. in U.S. No. 2,657,188); and as pour depressants in middle distillates (Ilnyckyj et al. in U.S. No. 3,048,479).

Because of this widespread use of ethylene/vinyl acetate copolymers, it would be extremely desirable if such polymers could also be used as viscosity index improvers in mineral oils, especially in mineral lubricating oils. The advantages accruing from such a potential use would be quite significant, i.e., better utilization of existing equipment and technical know-how, utilization of existing raw materials (i.e., ethylene and vinyl acetate), etc. These advantages would be even more significant if such an ethylene/vinyl acetate copolymer were more effective as a viscosity index improver in mineral oils than are conventional V.I. improvers now used in mineral oils (e.g. if they had better shear stability). Unfortunately, however, the prior art does not contain any teachings or suggestions that ethylene/vinyl acetate copolymers can be used as V.I. improvers in mineral oils (e.g. mineral lubricating oils).

The art (e.g., Coffman et al. in U.S. No. 2,499,723) teaches the use of certain critically defined normally solid ethylene/vinyl acetate copolymers as V.I. improvers in carboxylic ester type oils, only. However, repeated attempts to apply the teachings of Coffman et al. to mineral lubricating oils has been fraught with difficulty and these attempts have been marked with uniform failure. For example, Coffman et al. teach that the ethylene/vinyl acetate copolymers of their invention must have an ethylene/vinyl acetate mole ratio of from 1–6:1 (corresponding to vinyl acetate concentrations of from about 34 to 75 wt. percent). They teach that these ratios are critical and that without them, the V.I. function of the polymers is lost. Unfortunately, however, many of their critically defined polymers are insoluble in petroleum derived products. Adelmen & Olsen in their Belgian Patent (No. 586,895) teach that such copolymers having molar ratios of ethylene to vinyl acetate below 4:1 will not dissolve in wax in a satisfactory manner. Also, a certain polymer prepared in the present inventors laboratory and containing 34 wt. percent vinyl acetate (ethylene/vinyl acetate mole ratio of about 6:1) was found to be insoluble in wax. Since solubilities in wax and mineral lubricating oils are not ordinarily very different, it is apparent that the critically defined polymers of Coffman et al. are totally unsuited for use in mineral oils. Consequently, it was no surprise when attempts to use certain such polymers in mineral lubricating oils failed because of this insolubility problem.

In a similar fashion, attempts to use low molecular weight liquid copolymers such as the 64 to 75% vinyl acetate copolymers of Denison et al. (U.S. No. 2,657,188) were equally unsuccessful. Although such liquid polymers had not been suggested in the art as viscosity index improvers, it was hoped that they might perform better in mineral oils than did the normally solid copolymers of, for example, Coffman et al. (U.S. No. 2,499,723). They did not. However Dension et al. did suggest that even lower molecular weight copolymers (M.W. of less than 350) were oil soluble. Experience has shown, however, that these lower molecular weight polymers, although more soluble in mineral oil, do not function as effective V.I. improvers.

More recently, Ilnyckyj et al. in U.S. No. 3,048,479 have taught the preparation and use of ethylene/vinyl acetate copolymers as pour depressants in middle distillates. They discovered that copolymers containing generally less vinyl acetate than those of the prior art (e.g. 25 wt. percent vinyl acetate as compared with 65 wt. percent vinyl acetate) and having critically defined molecular weights (i.e., 1000 to 3000) are relatively soluble in mineral oils. They taught that such polymers would effectively lower the pour point of middle distillates, although they had no similar effect on mineral lubricating oils. They further pointed out that concentrations of the copolymer in oil of above 1 wt. percent were undesirable and that there was a tendency of the polymer to gel when present in sufficient quantities. Consequently, attempts to use these polymers as V.I. improvers in mineral lubricating oils were also unsuccessful. Small amounts of the polymers were oil-soluble, but ineffective, while large amounts caused gelation problems. In any event, no combination of polymer and mineral lubricating oil was reached that provided the necessary viscosity properties.

It has now been discovered, and this discovery forms the basis of the present invention, that certain critically defined ethylene/vinyl acetate copolymers can now be prepared, which copolymers are excellent V.I. improvers for mineral lubricating oils. These copolymers are neither completely solid like the copolymers of Coffman et al. nor are they completely liquid like the copolymers of Denison et al. Rather, the inventive materials are soft, resinous materials which are unctuous, frequently resembling cup-grease in consistency. These critically defined polymers must contain from 15 to 30 wt. percent vinyl acetate, with the remaining 85–70 wt. percent being ethylene. A particularly preferred material contains from 17 to 28 wt. percent vinyl acetate, e.g., from about 20 to 26 wt. percent vinyl acetate. To be significantly effective as V.I. improvers, the molecular weight of these inventive polymers must be controlled within the range of 3500 to 7000. Considerably more preferred are molecular weights within the range of about 3800 to 6500, especially from 4500 to 5500, e.g., 4700 to 5300. Optimum effective V.I. improvement occurs with copolymers having a molecular weight of about 5000 to 5500. Polymers having a molecular weight of from 4500 to 5000 are more shear stable, however. Thus, the molecular weight range of about 4500 to 5500 offers significant advantages over higher or lower molecular weight polymers. In general, the V.I. improving ability of a given polymer increases with molecular weight. In the present case, however, solubility of the polymer in mineral lubricating oils decreases as the molecular weight increases. Thus, it appears that the molecular weight range of 4500 to 5500 is particularly unique. The optimum molecular weight (from the standpoint of shear stability and V.I. potency) is about 5000.

The inventive polymers can be prepared by the process generally described in U.S. No. 3,093,623 (incorporated herein by reference). The preferred conditions recited therein are not, however, suited for preparing these higher molecular weight polymers. Consequently, a number of seemingly subtle changes to the conditions of that process have been made. Individually, these changes may not appear to be significant, but their cumulative effect is to enable a higher molecular weight polymer to be produced, which polymer is effective as a V.I. improver in mineral lubricating oil, contra the lower molecular weight materials and contra the polymers containing larger amounts of vinyl acetate.

According to the present invention, the inventive copolymers are prepared by a polymerization process conducted in a pressurized vessel with the aid of a solvent as, for example, toluene or hexane. It is preferred, however, to use benzene as the solvent. The reaction initiator will comprise an organic peroxy compound, preferably, di-tertiary-butyl-peroxide. As now understood, the temperature of the polymerization reaction must be within the range of from about 250° to 290° F., e.g., 270° to 285° F. A very desirable temperature is about 280° F. The pressure should be kept within the range of from about 600 to 10,000 p.s.i.g., e.g., 800 to 3,000 p.s.i.g. Ordinarily, the pressurized vessel (e.g., autoclave or similar equipment) charged with a mixture of solvent, initiator and vinyl acetate is purged with nitrogen and then purged with ethylene before charging the vessel with a sufficient amount of ethylene to yield the desired operating pressure when heated to the reaction temperature. During polymerization, additional ethylene is added to the reaction vessel to maintain the pressure at the desired level.

Polymerization is considered complete when the pressure in the vessel drops at a rate less than 50 p.s.i.g. per hour (as a result of a diminishing rate of ethylene absorption into the reactive solvent mixture). The inventive product is usually recovered by stripping solvent and unreacted vinyl acetate from the desired product under vacuum. At a constant concentration of vinyl acetate in the solvent, the amount of vinyl acetate in the final polymer has been observed to decrease with increasing partial pressure of ethylene.

Alternatively, the various reactants may be continuously fed to the reaction vessel, either alone or combined. Numerous process variations will be obvious to the routineer in light of this disclosure. See, for example, U.S. No. 3,093,623.

To illustrate the differences in molecular weight that may be obtained by simply adjusting pressure and temperature, a number of polymers were prepared using various reaction conditions. Table I, below, illustrates the type of product obtained using the reaction conditions of U.S. No. 3,093,623, while Table II illustrates the type of products obtained by use of the reaction conditions as specified herein.

TABLE I.—PRIOR ART SYNTHESIS OF COPOLYMERS OF ETHYLENE AND VINYL ACETATE
[Conditions of polymerization: 300° F., di-tert-butyl-peroxide initiator; benzene solution]

| Run No. | Vinyl acetate conc., weight percent | | Pressure, p.s.i.g. | Molecular weight |
| --- | --- | --- | --- | --- |
|  | In benzene | In product |  |  |
| 1 | Nil | Nil | 750 | 690 |
| 2 | 2.1 | 8.4 | 750 | 770 |
| 3 | 2.1 | 5.8 | 900 | 1,170 |
| 4 | 2.1 | 17.9 | 400 | 500 |
| 5 | 2.1 | 12.1 | 600 | 560 |
| 6 | 14.8 | 44.7 | 750 | 1,210 |
| 7 | 6.3 | 24.3 | 750 | 1,235 |
| 8 | 6.3 | 20.4 | 850 | 1,750 |
| 9 | 6.3 | 14.7 | 1,600 | 1,380 |

TABLE II.—PRESENT SYNTHESIS OF COPOLYMERS OF ETHYLENE AND VINYL ACETATE
[Conditions of polymerization: di-tert-butyl-peroxide initiator; benzene solution; 6 hours]

| Run No. | Temperature, °F. | Pressure, p.s.i.g. | Vinyl acetate conc. in product, weight percent | Molecular weight |
| --- | --- | --- | --- | --- |
| A | 285 | 900 | 20.4 | 3,800 |
| B | 270 | 900 | 27.2 | 6,500 |
| C | 275 | 900 | 20.8 | 4,725 |
| D | 280 | 2,000 | 25.1 | 5,300 |

Attempts to use the low molecular weight polymers of Table I as V.I. improvers in mineral lubricating oils were unsuccessful, i.e., any improvement in V.I. was nominal when compared with the usual V.I. improvement obtained with conventional V.I. improvers. However, the preferred high molecular weight polymers of the present invention (e.g., Runs C and D of Table II) are capable of imparting V.I. improvements to mineral lubricating oils which are greater than that produced by some commercially employed V.I. improvers (e.g., polybutene of 18,000 molecular weight).

The present invention will be more clearly understood by reference to the following specific examples which include a preferred embodiment. Unless otherwise indicated, all parts are by weight and all percentages are weight percentages.

Example 1

A one gallon stainless steel autoclave was purged with nitrogen and then with ethylene. Then, 1350 cc. of benzene (as the solvent) and 150 cc. of vinyl acetate were charged to the reaction vessel which was then pressurized with ethylene and heated to reaction conditions of 285° F. and 900 p.s.i.g. During the course of the polymerization, additional ethylene was added to maintain the pressure at 900 p.s.i.g. A simple mixture of 15 cc. of di-t-butyl peroxide in 45 cc. of benzene (as a diluent) was used as the initiator. The initiator mixture was injected into the reaction zone at the rate of 1.0 cc. per minute for 15 minutes. The remainder of the initiator mixture was added at the rate of 0.2 cc. per minute for about 225 minutes. The total polymerization time was 6 hours. The reactor was then cooled and the polymeric product was separated from the crude reaction mixture in a conventional manner. The yield was 553 grams of ethylene/vinyl acetate copolymer which contained 20.4 wt. percent vinyl acetate (balance of 79.6 wt. percent being ethylene). It had a molecular weight of 3800 as determined by cryoscopy using phenanthrene as the solvent. The copolymer was a soft resinous material having an ASTM dropping point of 171.5° F.

Example 2

The general procedure of Example 1 was followed using a reaction temperature of 270° F. The resulting product (332 grams) contained 27.2 wt. percent vinyl acetate and had a molecular weight of 6500 as determined by cryoscopy using phenanthrene as the solvent. The polymer was a soft resinous material having an ASTM dropping point of 165.3° F.

Example 3

The general procedure of Example 1 was followed using a reaction temperature of 275° F. Two hundred cc. of vinyl acetate were employed instead of 150 cc. as used in Example 1. The initiator mixture was added to the reaction zone at a rate of 0.25 cc. per minute for 240 minutes. The resulting product (565 grams) was a soft resinous material. It contained 20.8 wt. percent vinyl acetate and had a molecular weight of 4725 as determined by cryoscopy using phenanthrene as the solvent. This product was extremely shear stable.

Example 4

A slightly different technique was employed for this example. Better yields were obtained and the resulting product had very desirable V.I. improving properties, although it was somewhat less shear stable than the product of Example 3. The procedure followed here was as follows: The reaction vessel used for Examples 1 to 3 was purged as previously described. Then 1350 cc. of benzene was charged to the reactor which was kept under a positive pressure of ethylene while being heated to a reaction temperature of 280° F. When the temperature reached 280° F., sufficient ethylene was added to raise the pressure in the reactor to 2000 p.s.i.g. Then 450 cc. of vinyl acetate was injected into the reaction zone at a rate of 1.875 cc. per minute for 240 minutes. Simultaneously, 60 cc. of initiator mixture (described in Example 1) was added at a rate of 0.25 cc. per minute for 240 minutes. During the polymerization that followed, additional ethylene was added to maintain the pressure at 2000 p.s.i.g. The total polymerization time was six hours. The reaction mixture was then cooled and the polymeric product was separated from the crude reaction mixture in a conventional manner. The yield was 1387 grams of ethylene/vinyl acetate copolymer which contained 25.1 wt. percent vinyl acetate (balance of 74.9 wt. percent being ethylene). The polymeric product was a resilient, tough resin. It had a molecular weight of 5300 as determined by cryoscopy using phenanthrene as the solvent.

The products of Examples 1 to 4 were tested for shear stability and V.I. improving ability. In this respect, they were also compared with several commercially available V.I. improvers. The results of those tests are shown in Tables III and IV, infra. Shear stability was deter- TABLE III.—PRESENT ETHYLENE/VINYL ACETATE COPOLYMERS AS V.I. IMPROVERS COMPARED WITH TWO COMMERCIAL ADDITIVES
[Tested in S.A.E. #10 mineral lubricating oil having a viscosity at 100° F. of 33 centistokes and a V.I. of 92.0]

|  | Concentration | | | | | | | | |
| --- | --- | --- | --- | --- | --- | --- | --- | --- | --- |
|  | 1.0 wt. percent | | | 2.0 wt. percent | | | 4.0 wt. percent | | |
|  | V100 [1] | V210 [2] | V.I. | V100 | V210 | V.I. | V100 | V210 | V.I. |
| Additive of Example: | | | | | | | | | |
| 1 | 38.27 | 5.87 | 105.0 | 43.54 | 6.61 | 113.5 | 55.76 | 8.19 | 122.0 |
| 2 | 37.92 | 5.86 | 106.5 | 43.54 | 6.63 | 114.0 | 56.07 | 8.29 | 123.0 |
| 3 | 38.91 | 6.02 | 109.0 | 45.55 | 6.98 | 119.0 | 61.17 | 9.19 | 128.5 |
| 4 | 44.63 | 6.96 | 121.5 | 60.08 | 9.26 | 131.5 | 104.39 | 15.55 | 137.0 |
| Commercial A [3] | 49.25 | 8.37 | 138.0 | | | | | | |
| Commercial B [2] | 47.11 | 7.14 | 119.0 | | | | | | |

[1] V100=viscosity at 100° F. in centistokes.
[2] V210=viscosity at 210° F. in centistokes.
[3] Commercial A=a commercially available polymethacrylate ester V.I. improver.
[4] Commercial B=a commercially available polybutene (18,000 mol. wt.) V.I. improver.

TABLE IV.—SHEAR STABILITIES OF PRESENT ETHYLENE/VINYL ACETATE POLYMERS COMPARED WITH TWO COMMERCIAL ADDITIVES
[Tested in S.A.E. #30 mineral lubricating oil having a V.I. of 90.3]

|  | Conc. weight percent | V.I. | V210 | | Percent viscosity loss due to shear breakdown [1] |
| --- | --- | --- | --- | --- | --- |
|  |  |  | Before breakdown cs. | After breakdown cs. |  |
| Additive of Example: | | | | | |
| 3 | 1.2 | 104.4 | 14.99 | 14.87 | 4.9 |
| 3 | 1.2 | 104.4 | 14.99 | 14.88 | 4.6 |
| 4 | 0.5 | 102.3 | 15.00 | 13.98 | 42.2 |
| Commercial A | 0.57 | 105.8 | 15.02 | 13.48 | 63.2 |
| Commercial B | 0.56 | 99.8 | 15.10 | 14.54 | 22.2 |

[1] Percent viscosity loss = $\frac{\text{(Initial} - \text{Final)}}{\text{(Initial} - \text{Base stock)}} \times 100$.

mined by the sonic technique described in ASTM Standards, vol. I, (1961), page 1160, "Test for Shear Stability of Polymer-Containing Oils."

From Tables III and IV it can be appreciated that the present critically defined copolymers are effective V.I. improvers for mineral lubricating oils. In this respect, they offer as much or more V.I. improving ability as do conventional polybutene V.I. improvers and they are more shear stable than conventional polymethacrylate V.I. improvers.

Mineral lubricating oil compositions will generally contain from 0.1 to 10.0 wt. percent of the copolymers, more usually, they will contain from 0.25 to 5.0 wt. percent, e.g., 0.5 to 2.0 wt. percent (all percentages based on 100 parts by weight of mineral lubricating oil). In every case, the copolymers will be present in effective amounts ranging from more than incidental impurities.

Ordinarily, mineral lubricating oils having a viscosity of from 60 to 1200 SUS at 100° F., and more usually, from 100 to 600 SUS at 100° F. will be employed. The mineral lubricating oils may also be fortified with other additives in varying amounts, e.g., rust inhibitors, corrosion inhibitors, anti-foaming agents, E.P. agents, anti-wear agents, etc. Usually, these other additives will be present in amounts of from 0.1 to 10.0 wt. percent each, although other amounts are sometimes used.

Having described the present invention with a certain degree of particularity, it will be realized that various modifications may be made within the spirit and scope of the following claims. The true nature of our invention is indicated by the appendant claims.

What is claimed is:
1. A composition useful as a lubricant which comprises:
   (a) 100 parts by weight of a mineral lubricating oil, and
   (b) a viscosity index improving amount of from 0.1 to 10.0 parts by weight of an unctuous copolymer or ethylene and vinyl acetate, said copolymer containing from 15 to 30 wt. percent vinyl acetate and having a molecular weight of from 3500 to 7000.
2. A composition as defined by claim 1 wherein said copolymer has a molecular weight of from 3800 to 6500.
3. A composition as defined by claim 1 wherein said copolymer has a molecular weight of from 4500 to 5500.
4. A composition useful as a lubricant which comprises:
   (a) 100 parts by weight of a mineral lubricating oil having a viscosity of from 60 to 1200 SUS at 100° F., and
   (b) a viscosity index improving amount of from 0.1 to 10.0 parts by weight of an unctuous copolymer of ethylene and vinyl acetate, said copolymer containing from 15 to 30 weight percent vinyl acetate and having a molecular weight of from 4500 to 5500.
5. A composition as defined by claim 4 wherein said copolymer contains from 17 to 28 weight percent vinyl acetate.
6. A composition as defined by claim 5 wherein said composition comprises from 0.25 to 5 parts by weight of said copolymer.
7. A composition useful as a lubricant which comprises:
   (a) 100 parts by weight of a mineral lubricating oil, and
   (b) a viscosity index improving amount of from 0.1 to 10 parts by weight of an unctuous copolymer of ethylene and vinyl acetate, said copolymer containing from 17 to 28 weight percent vinyl acetate and having a molecular weight of from 4500 to 5500.
8. A composition as defined by claim 7 wherein said copolymer has a molecular weight of from about 4700 to 5300 and contains from about 20 to 26 weight percent vinyl acetate.
9. A composition as defined by claim 8 wherein said copolymer has a molecular weight of about 5000.

References Cited by the Examiner
UNITED STATES PATENTS

| | | | |
|---|---|---|---|
| 2,499,723 | 3/1950 | Coffman et al. | 252—56 |
| 2,803,598 | 8/1957 | Black et al. | 252—56 X |
| 3,126,364 | 3/1964 | Ilnyckyj | 252—56 X |

DANIEL E. WYMAN, *Primary Examiner.*

P. P. GARVIN, *Assistant Examiner.*